United States Patent
Licata et al.

(10) Patent No.: US 8,206,255 B2
(45) Date of Patent: Jun. 26, 2012

(54) FRICTION WHEEL ACTUATOR

(75) Inventors: Federico Domenico Licata, Turin (IT); Gianluca Cariccia, Romano Canavese (IT); Heinz Lemberger, Unterfohring (DE)

(73) Assignee: Dayco Europe S.r.l., Chieti (IT)

( * ) Notice: Subject to any disclaimer, the term of this patent is extended or adjusted under 35 U.S.C. 154(b) by 991 days.

(21) Appl. No.: 11/885,238

(22) PCT Filed: Feb. 24, 2006

(86) PCT No.: PCT/EP2006/060281
§ 371 (c)(1), (2), (4) Date: May 12, 2008

(87) PCT Pub. No.: WO2006/089960
PCT Pub. Date: Aug. 31, 2006

(65) Prior Publication Data
US 2009/0023546 A1    Jan. 22, 2009

(30) Foreign Application Priority Data
Feb. 28, 2005 (EP) .................................. 05425112

(51) Int. Cl.
*F16H 1/32* (2006.01)

(52) U.S. Cl. ........................ 475/163; 475/172

(58) Field of Classification Search .................. 475/162, 475/163, 172
See application file for complete search history.

(56) References Cited

U.S. PATENT DOCUMENTS

| | | | | | |
|---|---|---|---|---|---|
| 2,941,357 | A | * | 6/1960 | Barton | 60/39.281 |
| 3,768,450 | A | * | 10/1973 | Harrison | 123/339.28 |
| 7,425,186 | B2 | * | 9/2008 | Lemberger | 476/48 |
| 7,434,442 | B2 | * | 10/2008 | Gombas | 72/449 |
| 7,942,774 | B2 | | 5/2011 | Persiani | |

FOREIGN PATENT DOCUMENTS

| | | |
|---|---|---|
| EP | 1464870 | 10/2004 |
| JP | 199022635 | 1/1990 |

OTHER PUBLICATIONS

JP Appln. No. 2007-557479—Apr. 12, 2011 JPO Office Action.

* cited by examiner

*Primary Examiner* — Ha D. Ho
(74) *Attorney, Agent, or Firm* — Davidson Berquist Jackson & Gowdey, LLP

(57) ABSTRACT

Actuator adapted to cooperate with a drive of an endothermic engine including power source and a releasable accessory, the actuator including a box-shaped casing, a motorized eccentric group housed inside the casing and including a reduction gearing, an arm cooperating with the eccentric group and supporting a friction wheel adapted to cooperate with the accessory and with the power source, the arm being mobile between an engaged position and a disengaged position of the accessory.

27 Claims, 6 Drawing Sheets

FRICTION WHEEL ACTUATOR

TECHNICAL FIELD

The present invention refers to a friction wheel actuator adapted to cooperate with a power source of an endothermic engine for driving an accessory.

BACKGROUND ART

As is well known, it is possible to turn on and off some accessories of an endothermic engine to obtain advantageous energy savings on board the vehicle. For example the water pump can be disconnected during starting transients to allow the motor to reach the rated temperature as fast as possible.

For this purpose it is possible to provide a water pump that can be connected to a power source by means of a selectively mobile friction wheel actuator that comprises a driving unit and a friction wheel connected to the driving unit. For example, the power source can be a traditional drive of accessories including a pulley rigidly connected to a driving shaft, at least a pulley connected to an accessory and a belt wound around the pulleys to allow power transfer.

In particular, the friction wheel cooperates with the back of the belt along the winding arc around the pulley of the driving shaft and is mobile by means of the actuator to selectively engage by friction a pulley not cooperating with the belt and keyed to the shaft of the water pump.

Friction wheel actuators, driven by a hydraulic linear actuator that can nevertheless be damaged by the vibrations and impacts suffered in a direction perpendicular to the axis of the stem causing reliability problems, are well known. In addition linear actuators can be very poorly controlled as for the position of the friction wheel and tend to have response times which are too long in dynamic conditions.

EP-A-1464870 discloses a friction wheel actuator having the features of the preamble of claim 1.

DISCLOSURE OF INVENTION

An object of the present invention is to implement a friction wheel actuator that does not have the drawbacks mentioned above and which is moreover compact in size.

The object of the present invention is achieved by a friction wheel actuator.

BRIEF DESCRIPTION OF THE DRAWINGS

For a better understanding of the present invention a preferred implementation is now described, exclusively as a non-limiting example and with reference to the enclosed drawings, wherein.

BEST MODE FOR CARRYING OUT THE INVENTION

Figure 1:
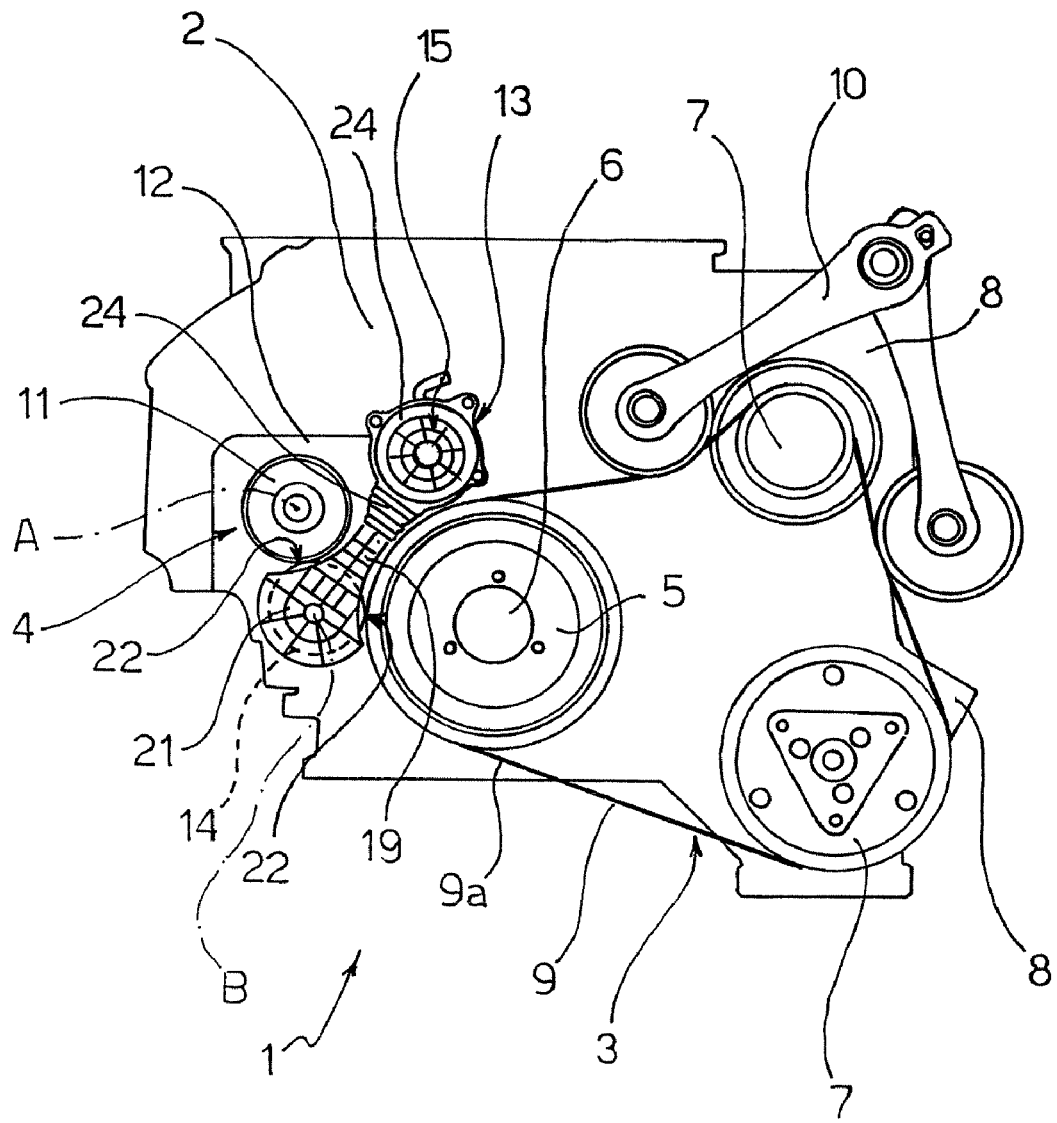
FIG. 1 is a front view of a drive including an actuator according to the present invention.

In FIG. 1 number 1 designates, as a whole, a drive of accessories of an internal combustion engine 2 including a belt drive 3 and a friction wheel drive 4 driven by a belt drive 3.

The belt drive 2 includes a pulley 5 integral with a crankshaft 6 of the motor 2, two pulleys 7 connected to relevant accessories 8 and a poly-V belt 9 wound around the pulleys 5 and 7 to enable a power transfer between the driving shaft 6 and the accessories 8.

In particular, the belt 9 is held under tension by a tensioner 10 and is provided with a back part 9a radially opposite to the pulleys 5 and 7 and cooperating with the friction wheel drive 4 that includes a driven pulley 11 connected to a disconnectable accessory 12 and having a fixed axis A, and a actuator 13 with a friction wheel 14 rotating around an axis B parallel to the axis A and mobile between an engaged position wherein the friction wheel 14 cooperates both with the back part 9a and the driven pulley 11 and a released position in which the friction wheel 14 cooperates only with the back part 9a.

The actuator 13 includes moreover a fixed box-shaped casing 15 defining an internal chamber 16 and a lateral opening 17, an eccentric group 18 inside the chamber 16 and a mobile arm 19 coming out from the opening 17 and having an end portion 20 connected to the eccentric group 18 and an end box-shaped portion 21 partially enclosing the friction wheel 14 defining the axis B and having respective circumferential openings 22 to enable the contact of the friction wheel 14 with the belt 9 and the driven pulley 11.

In particular, (FIG. 2) the casing 15 includes a substantially cup-shaped base 23 and a closure shell 24 rigidly connected and releasable from the base 23 with which it encloses the eccentric group 18 and delimits the opening 17 that is closed by a flexible sleeve 25 sealingly connected against contaminant particles, to the arm 19 on the one hand and to the casing 15 on the other.

The base 23 of the casing 15 includes a circular crown flat end wall 26, a tubular element 27 coming perpendicularly out from the end wall 26 and delimitating a compartment 28, and a second tubular element 29 concentric to the tubular element 27 and housing an electric motor 30.

In addition, the casing 15 includes a releasable cap 31 that closes the compartment 28 blocking the motor 30 from the opposite part of the shell 24 and has built-in supply contacts 32 of the electric motor 30 that can be connected to the on-board electric system as will be better described hereafter.

The motor 30, drives by means of a pinion 41 rotating around an axis C of the tubular element 27, the eccentric group 18 that includes a double reduction stage epicyclical gearing 42 placed on the opposite side of the cap 31 with respect to the motor 30 and having a solar gear 43, three planetary gears 44 at 120°, two planetary gears 45 at 180° and two gear holders 46, 47 respectively supporting the planetary gears 44 and 45.

In addition the eccentric group 18 includes an eccentric 48 radially external to gearing 42 and two crown gears 49, 50 internally toothed respectively integral with the tubular element 27 and whit the eccentric 48 and meshing with the gearing 42.

In particular, the eccentric 48 has an internal cylindrical surface 51 having an axis that coincides in use with the axis C and an external cylindrical surface 52 having an axis D parallel to axis C and spaced by an eccentricity 'e'. The internal cylindrical surface 51 engages rotatably the tubular element 27 while the external cylindrical surface 52 engages rotatably the circular housing 53 of the end portion 20.

Figure 3:
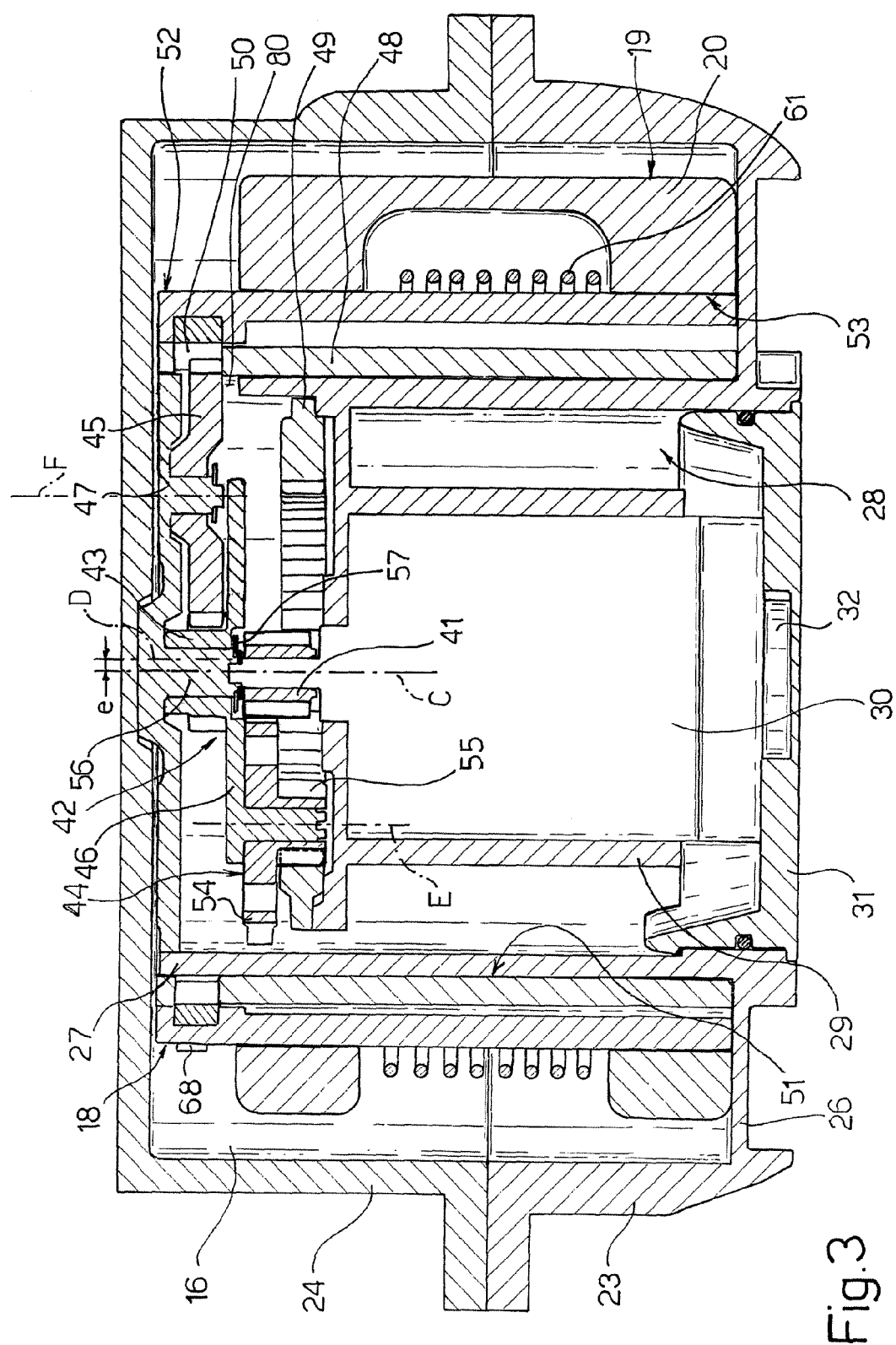
FIG. 3 is a cross section according to line III-III of FIG. 2.

The eccentric 48 is driven by the gearing 42 (FIG. 3) through pinion 41 that meshes with planetary gears 44 engaged on the crown gear 49 being clamped on the tubular element 27.

Each of the planetary gears 44 integrally includes a first and a second gear wheel 54, 55 rotating around the same axis E integral with the gear holder 46 and having respective number of teeth Z1 and Z2, Z1 being bigger than Z2. The wheel 54 directly meshes with the pinion 41 while the wheel 55 meshes with the crown gear 49.

The second stage of the gearing 42 overlapping the first one with respect to the gear holder 46 includes the solar gear 43 integral with the gear holder 46, the planetary gears 45 cooperating both with the solar gear 43 and the crown gear 50 and the gear holder 48 that rigidly and releasably engages the tubular element 27 on the opposite part of the opening 17 overlapping to the planetary gears 45.

In particular, the solar gear 43 is on the opposite part of the planetary gears 44 with respect to the gear holder 46 while the gear holder 47 is supported parallel to the axis C by the tubular element 27 and includes both a pin 56 radially supporting the rotation of the gear holder 46 and an elastic stop ring 57 connected to the pin 56 and adapted to slidingly support the gear holder 46 parallel to axis C.

Therefore, the gearing 42 forms a removable group and the gear holder 47 closes the tubular element 27 at the top, being substantially disc-shaped, its diameter being equal to that of the tubular element 27 and moreover including two support axial appendixes 58 radially opposite and adapted to cooperate in a clamped way with correspondent conjugated portions 58a carried by an axial end portion of the tubular element 27 facing the shell 24 to moreover define the centring of the planetary gears 44 on the pinion 41 and on crown gear 49 and of the planetary gears 45 on the crown gear 50.

The tubular element 27 has, in addition, two circumferential grooves 80 arranged at 90° with respect to the conjugated portions 58a and delimitated on their top part by the gear holder 47, housing respective circular segments of the planetary gears 45 that have rotation axis F internally to tubular element 27 and mesh with the crown gear 50 placed externally to the tubular element 27.

In addition the eccentric group 18 includes a manual driving device 59 cooperating with an edge 60 of the eccentric 48 having a circular sector-shaped crown gear and a helical spring placed externally to the eccentric 48 and respectively connected to the end portion 20 of the arm 19 and to the eccentric 48.

In particular, the edge 60 is axially raised with respect to the arm 19 internally carrying the crown gear 50 and has a pair of radial abutments 66 protruding with respect to the external cylindrical surface 52 and a pair of axial abutments 67 coming out in a direction parallel to the axis C towards the shell 24, both abutments lying on opposite parts of the same diameter of the edge 60 passing through the axis D.

Figure 6:
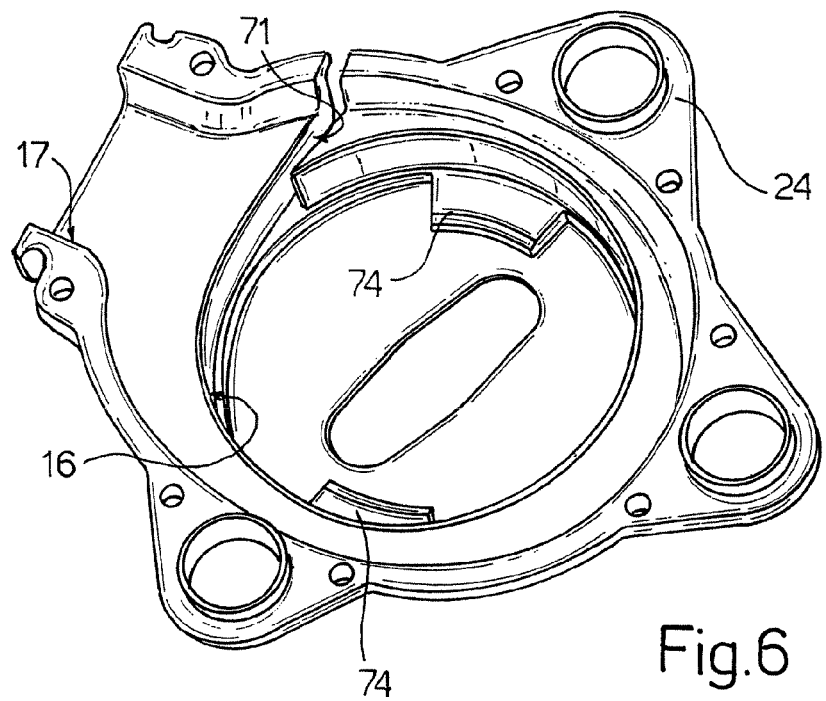
FIG. 5 and FIG. 6 are enlarged perspective views of a second detail of the actuator of FIG. 1.
Figure 5:
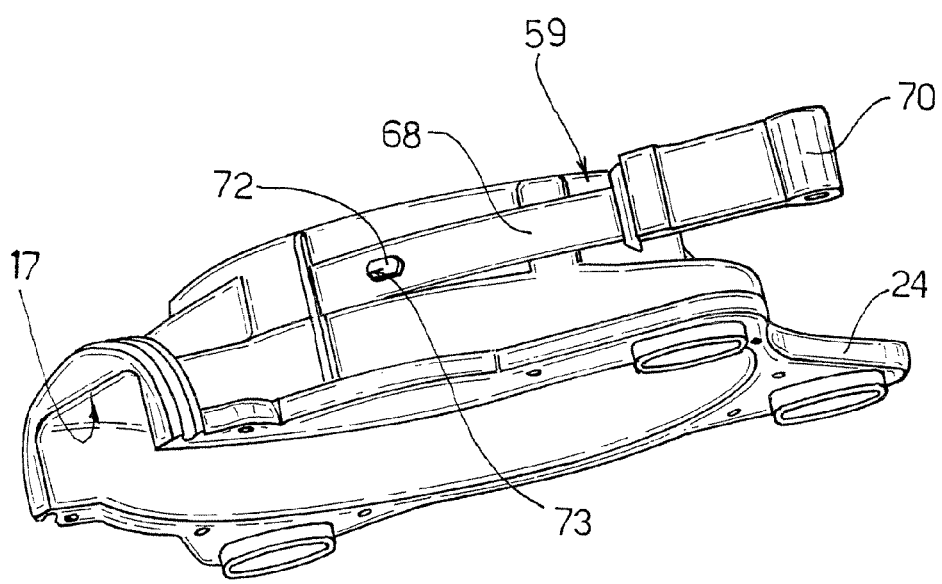

The radial abutments 66 are adapted to cooperate with the manual device 59 that integrally comprises a flexible band 68 wound around the edge 60, a dragging head 69 in use circumferentially sliding in-between the radial abutments 66 and a grip handle 70 on the opposite end of the dragging head 69 and coming out from a radial slit 71 of the shell 24 (FIGS. 5 and 6), that integrally includes a radial block 72 placed near the slit 71 and adapted to cooperate with a slot 73 carried by the band 68 in order to define a maintenance position for the accessories drive 1.

The axial abutments 67 are adapted to cooperate with a corresponding pair of equidistant projections 74 coming out from the shell 24 parallel to the axis C towards the edge 60 and defining the angular maximum run of the eccentric 48.

Figure 8:
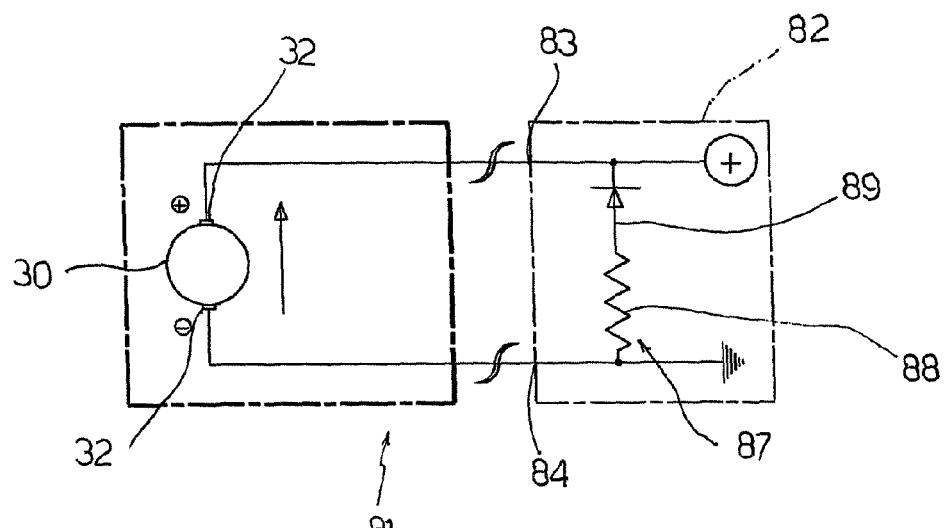
FIG. 8 is a scheme of a control circuit of an electric motor of the actuator of the present invention.

FIG. 8 discloses a control circuit 81 for the motor 30 of the actuator 13. The circuit 81 includes a PWM (pulse width modulation) controller 82 implemented in an engine control unit (ECU, not shown). The controller 82 includes a positive terminal 83 and a negative terminal 84 connected to the respective supply contacts 32 of the motor 30. An electric dissipator 87 is connected to the controller 82 in parallel with the motor 30, and includes a resistor 88 and a diode 89 allowing unidirectional current flow through the resistor 88 from negative terminal 84 to positive terminal 83.

The operation of the actuator 13 will now be described.

During normal operation of the motor 2 the releasable accessory 12 is dragged by the belt drive 3 and the actuator 13 is in the engaged position held by the spring 61 pre-load and defined by the contact of the friction wheel 14 against the belt 9 and the driven pulley 11.

Figure 2:
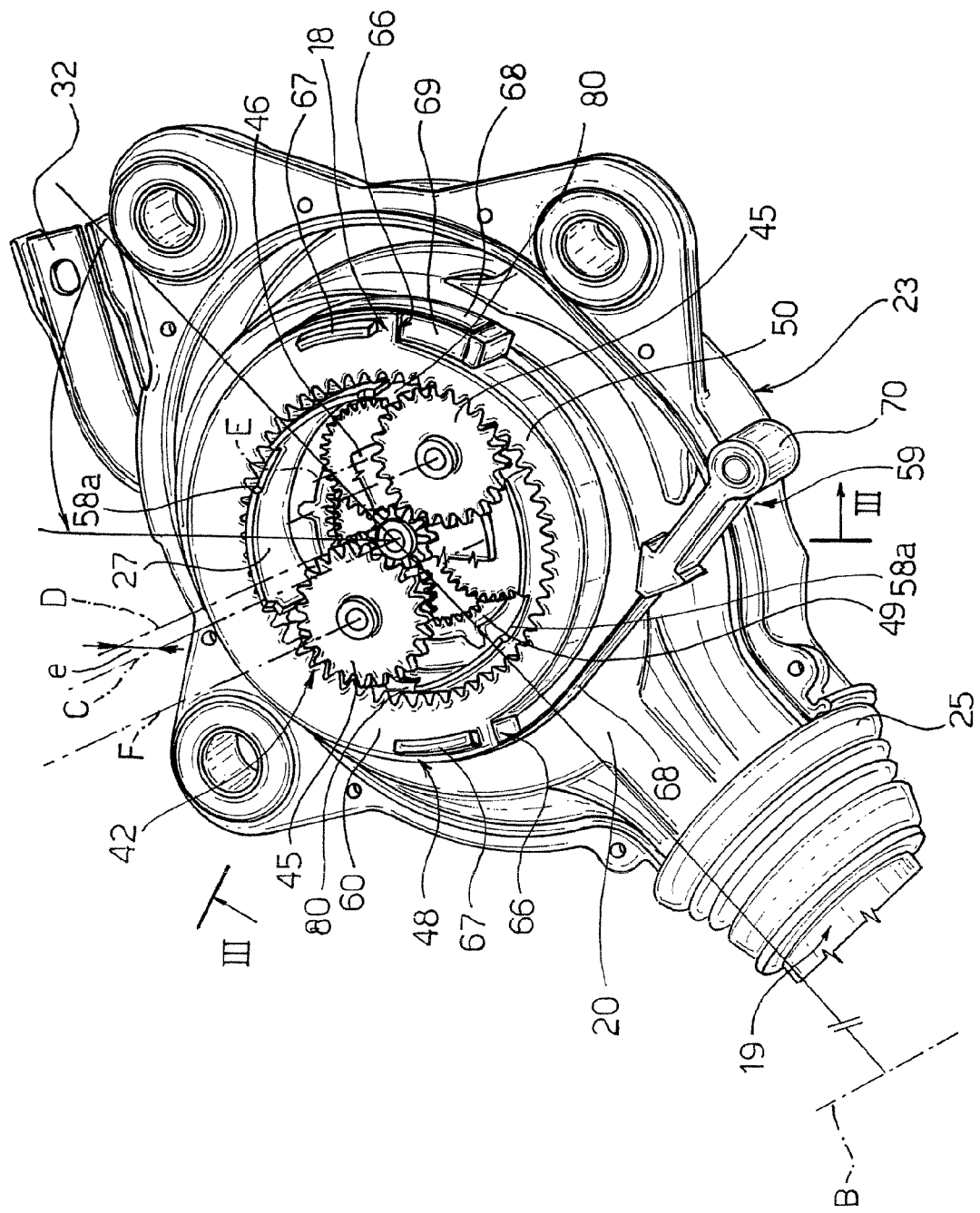
FIG. 2 is perspective partial view of the actuator according to the present invention where details have been omitted for clarity purposes.

Such an angular position is characterized by the fact that the eccentricity 'e' forms a substantially 90° angle α having its centre on the axis C and measured in an counterclockwise direction starting from line 'r' perpendicular to and passing through the axes B and C (FIG. 2). The value of the angle α in the engaged position varies during the life of the drive accessories 1 as a consequence of the reduction in the diameters of the friction wheel 14 and of the driven wheel 12 because of wear.

When it is necessary to release the releasable accessory 12, the motor 30 is driven against the action of the spring 61 causing a rotation of the eccentric 48 in a counter-clockwise direction until abutting on the axial abutment 67 and therefore causing the friction wheel 14 to move away from the driven pulley 11 as a consequence of the eccentricity 'e' being comprised between the two axes B and C increasing the relevant distance.

Figure 9:
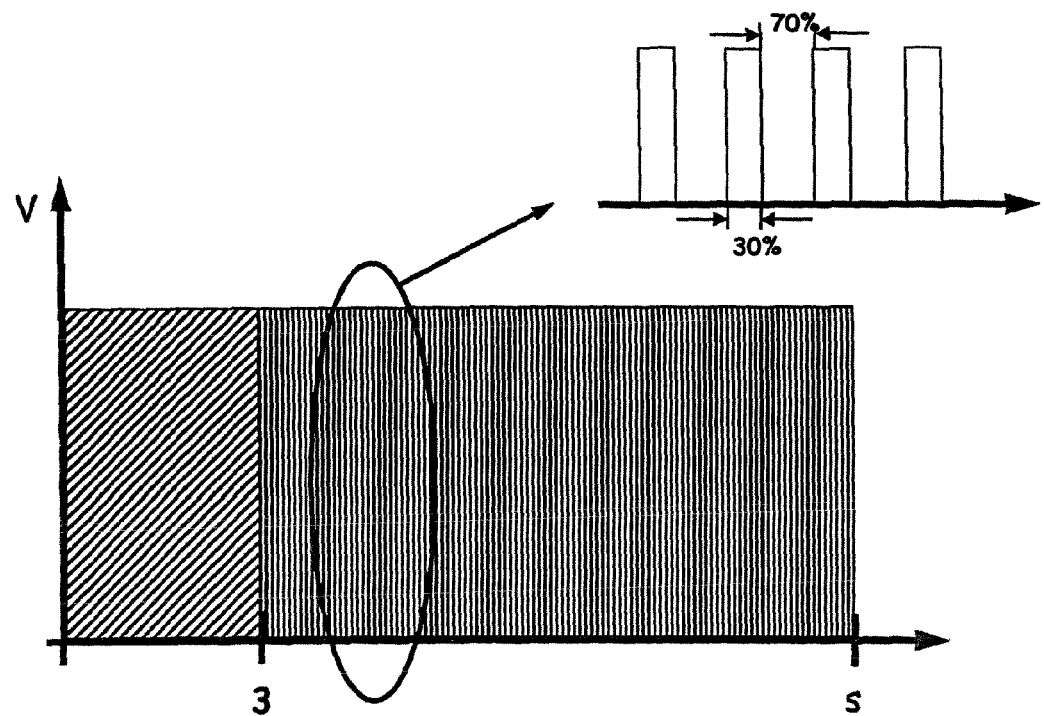
FIG. 9 is a diagram showing the current fed to the electric motor of the actuator.

After the eccentric 48 has come to the abutment position, the motor 30 is mechanically stopped, although electrically supplied. To avoid any undesired overheating of the motor 30, the latter is preferably supplied by the PWM controller 82 with a pulse-width modulated current as shown in the diagram of FIG. 9: for a first time interval, e.g. 3 seconds, full voltage battery DC current is supplied; thereafter, PWM current in the form of pulses having a frequency of e.g. 5 KHz and a 30% duty-cycle is fed, which has proven to be enough to overcome the reaction of spring 61.

Then the motor 30 is disconnected and the action of spring 61 causes the eccentric 48 to rotate in a clockwise direction restoring the engaged position of the actuator 13. In turn, motor 30 is rotated back through the action of crown gear 50 on gearing 42 that is dimensioned so as to be reversible, i.e. to allow the rotation of the eccentric 48 even when a torque such as that exerted by the spring 61 is directly applied to the same eccentric 48. Reverse rotation of motor 30 causes the same to act as a generator and produce a current that flows through dissipator 87, which produces a mechanical resistance on the motor and therefore acts as an "electric brake" that makes the pump re-engagement softer.

In addition, the actuator 13 can be positioned in a maintenance position corresponding to the maximum value of the angle α defined by the axial abutment 67 against the projections 74 and can be manually reached using the manual device 59. As the band 68 is pulled out acting on the handle 70, in a first part of the run the dragging head 69 freely slides along the edge 60 and then rotatively drags the eccentric 48 against the action of the spring 61 after having abutted against the radial abutment 66. Finally the slot 73 reaches the stop 72 and being blocked maintains the angular position of the eccentric 48 fixed against the projections 74.

The actuator 13 automatically returns to the engaged position driven by the action of the spring 61 that winds up once again the band 68 dragged by the radial abutments 66 when the slot 73 is disengaged from the stop 72. In particular, the radial abutments 66 are spaced angularly in such a way that the dragging head does not interfere with the radial abutments 66 themselves when the motor 30 drives the eccentric 48.

According to a preferred embodiment, the value of the angle α in the engaged position varies from +105° in a no wear condition to +80° in a maximum wear condition, the total run of the eccentric 48 being between +45° and +165° and defined by the angular positions and by the sizes in a circumferential direction of the axial abutments 67 and the projections 74.

By considering at the characteristics of the actuator 13 implemented according to the present invention the advantages it provides become evident.

In particular, the gearing 42 that drives the eccentric 18 allows the production of a device that is little sensible to vibrations and that allows the positioning of the arm 19 to be easily controlled restricting the size thereof.

The use of an epicyclical gearing 42 allows for high reduction ratios, which in turn increase position controllability at a reduced dimensions.

The implementation of a two stage gearing 42 allows to achieve in a simple way the reversibility of the proper gearing 42 leaving the eccentric 48 free to move both by the action of the spring 61 and the action of the manual device 59.

In addition, the presence of the spring 61 ensures the engaged condition and therefore the operation of the releasable accessory should an accidental failure occur to the on board electric plant enhancing reliability and the presence of the manual element 59 makes the drive maintenance operations easier as they can be carried out without the need of an electric supply. The gearing 42 defines a single device that is easy to assemble onto the eccentric group 18 making the maintenance procedures of the group 18 easier.

In addition, the gear holder 56 closes the gearing 42 at the top, inside the tubular element 27 and the sleeve 25 closes the opening 17 allowing the gearing 42 to be protected against external damaging agents.

Finally it is clear that modifications and variations can be made to the actuator 13 described and illustrated herein without departing from the scope of the present invention, as defined by the attached claims.

For example, angle α values in the different working positions may change.

Figure 7:
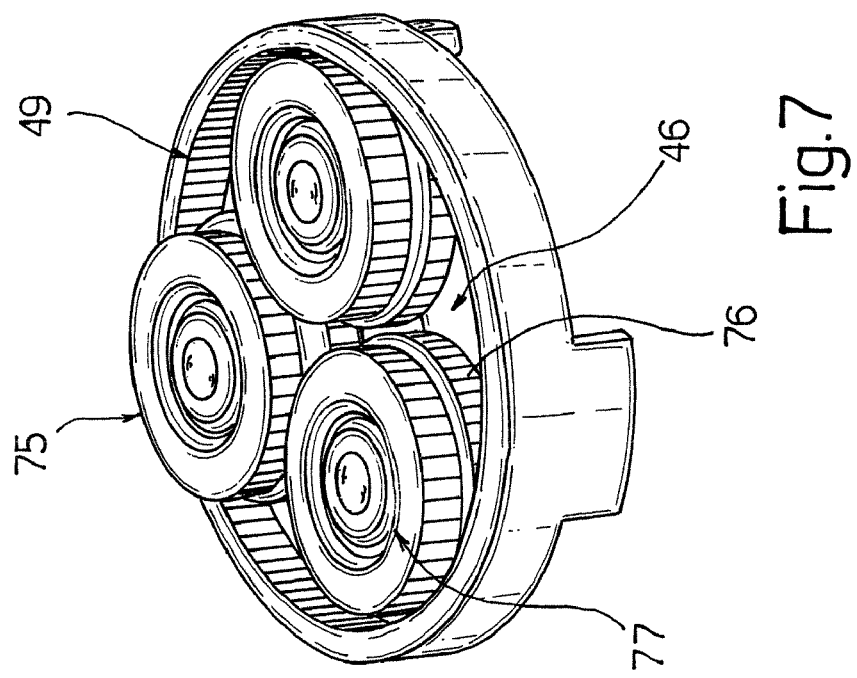
FIG. 7 is a perspective view of a detail of FIG. 1 according to a further implementation.
Figure 4:
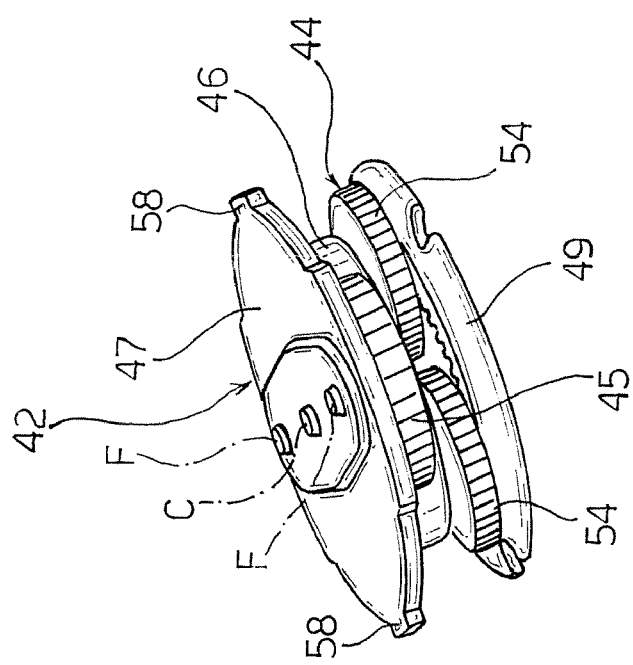
FIG. 4 is a perspective view of a first enlarged detail of FIG. 1.

In addition (FIG. 7) the gearing 42 can be implemented in a second configuration wherein the gear holder 48 and the solar gear 43 have been omitted. In this last case, the gearing 42 includes planetary gears 75 each comprising a pair of gear wheels 76, 77 integral to each other and carried by the gear holder 46 rotatable around a respective axis E. The wheels 75, 76 have respective number of teeth Z3, Z4 with Z3 bigger that and respectively meshing with the crown gear 49 and with the crown gear 50. In this last case the overall size of the gearing 42 is further reduced.

The invention claimed is:

1. An actuator adapted to cooperate with an accessory drive of an endothermic engine including a power source and a releasable accessory, said actuator including a casing, a PWM controller for supplying said motor with pulse-width modulated current, an eccentric group supported by said casing and including an eccentric, a driving device cooperating with said eccentric via a reduction gearing, a mobile arm cooperating with said eccentric, and a friction wheel rotatably supported around a first axis carried by said mobile arm and adapted to cooperate with said accessory and said power source, said friction wheel being displaced by said mobile arm between a position of engagement of said accessory and a position of disengagement of said accessory with the said power source, wherein said driving device and said reduction gearing are housed within said eccentric.

2. The actuator according to claim 1, wherein said casing includes a tubular element having a second axis and in that said eccentric has an internal cylindrical surface rotatably coupled with said tubular element and a cylindrical external surface having a third axis parallel to said second axis and freely rotationally coupled inside a circular seat carried by said arm.

3. The actuator according to claim 2, wherein said reduction gearing is epicyclical and cooperates with a first and a second crown gear respectively integral with said tubular element and said eccentric and in that said reduction gearing includes at least a gear holder rotatable around said second axis and carrying in a freely rotating way first planetary gears.

4. The actuator according to claim 3, wherein said first planetary gears integrally include a first and a second gear wheel cooperating respectively with said first and second crown gear.

5. The actuator according to claim 3, wherein said reduction gearing includes a second gear holder having a pin that rotationally supports said at least one gear holder around said second axis and second planetary gears supported by said second gear holder and driven by a solar gear rotationally integral with said at least one gear holder.

6. The actuator according to claim 5, wherein said second gear holder is rigidly and dismountably connected to said tubular element and includes a stop ring connected to said pin in order to support said at least one gear holder in a position parallel to said second axis.

7. The actuator according to claim 3, wherein said driving device is an electric motor housed inside said tubular element and driving a pinion meshing with said first planetary gears.

8. The actuator according to claim 1, further including a resilient thrust element cooperating with said eccentric in order to maintain the position of engagement.

9. The actuator according to claim 8, further including a manual driving device cooperating with said eccentric.

10. The actuator according to claim 9, further including a blocking element carried by said casing and cooperating with said manual device in order to maintain a fixed angular position of said eccentric.

11. The actuator according to claim 9, wherein said eccentric integrally includes an abutment element and in that said manual device includes a flexible element wrapped around said eccentric and a dragging head adapted to cooperate with said abutment element at least in said fixed angular position.

12. The actuator according to claim 1, wherein said casing is box-shaped and houses said eccentric group.

13. An actuator adapted to cooperate with an accessories drive of an endothermic engine including a power source, and for selectively coupling a releasable accessory to the power source, said actuator including a casing, an eccentric group supported by said casing and including an eccentric, a driving device cooperating with said eccentric via a reduction gearing, a mobile arm cooperating with the said eccentric and a friction wheel rotatably supported around a first axis carried by said arm and adapted to cooperate with said releasable accessory and said power source, said friction wheel being displaced by said mobile arm between a position of engagement of said releasable accessory and a position of disengagement of said releasable accessory with the said power source, wherein said driving device and said reduction gearing are housed within said eccentric.

14. The actuator according to claim 13, wherein said power source comprises a first and a second rotating pulleys and a belt wound around said pulleys and in that said friction wheel cooperates with a back of said belt.

15. The actuator according to claim 14, wherein said casing includes a tubular element having a second axis and in that said eccentric has an internal cylindrical surface rotatably coupled with said tubular element and a cylindrical external surface having a third axis parallel to said first axis and freely rotationally coupled inside a circular seat carried by said arm, and in that said driving device is an electric motor housed inside said tubular element.

16. The actuator according to claim 15, wherein said reduction gearing is epicyclical and cooperates with a first and a second crown gear respectively integral with said tubular element and said eccentric and in that said reduction gearing includes at least a gear holder rotatable around said second axis and carrying in a freely rotating way first planetary gears.

17. The actuator according to claim 16, wherein said first planetary gears integrally include a first and a second gear wheel cooperating respectively with said first and second crown gear.

18. The actuator according to claim 16, wherein said reduction gearing includes a second gear holder having a pin that rotationally supports said at least one gear holder around said second axis and second planetary gears supported by said second gear holder and driven by a solar gear rotationally integral with said at least one gear holder.

19. The actuator according to claim 15, wherein said reduction gearing is reversible and by including a dissipator connected in parallel to said motor a mechanical resistance is established on said motor when spun back by the force of a thrust element.

20. The actuator according to claim 15, wherein said actuator includes a PWM controller for supplying said motor with pulse-width modulated current.

21. The actuator of claim 20, wherein said controller supplies said motor with a DC current for a predetermined time interval and with said pulse-width modulated current after said interval.

22. The actuator according to claim 13, wherein said driving device is an electric motor housed inside said tubular element and driving a pinion meshing with said first planetary gears.

23. The actuator according to claim 13, further including a resilient thrust element cooperating with said eccentric in order to maintain the position of engagement.

24. The actuator according to claim 23, further including a manual driving device cooperating with said eccentric.

25. The actuator according to claim 24, further including a blocking element carried by said casing and cooperating with said manual device in order to maintain a fixed angular position of said eccentric.

26. The actuator according to claim 24, wherein said eccentric integrally includes an abutment element and in that said manual device includes a flexible element wrapped around said eccentric and a dragging head adapted to cooperate with said abutment element at least in said fixed angular position.

27. The actuator according to claim 13, wherein said casing is box-shaped and houses said eccentric group.

\* \* \* \* \*